July 12, 1932.  H. W. FINK  1,866,846
AUTOMOBILE HEATER
Filed Oct. 23, 1929

INVENTOR
HENRY W. FINK
By Paul, Paul & Moore
ATTORNEYS

Patented July 12, 1932

1,866,846

UNITED STATES PATENT OFFICE

HENRY W. FINK, OF MINNEAPOLIS, MINNESOTA, ASSIGNOR TO TROPIC-AIRE, INCORPORATED, OF MINNEAPOLIS, MINNESOTA, A CORPORATION OF DELAWARE

AUTOMOBILE HEATER

Application filed October 23, 1929. Serial No. 401,908.

This invention relates to an automobile heater, and an object of the invention is to provide an automobile heater which will present certain improvements over the heater of the patent to Caesar No. 1,668,491, granted May 1, 1928.

The heating unit of the Caesar patent identified consists of a heating member casing including an outer wall, an inner wall in spaced relation to said outer wall providing an opening through the casing, a heating medium container between said inner and outer walls adapted to receive water from the water-circulating cooling system of an internal combustion engine made to pass through said container or containers, and air-circulating passages traversing said container or containers, and a motor axially mounted within the inner wall of said casing and supporting a fan disposed adjacent an end of the air-circulating passages and adapted to cause air to be forcibly circulated therethrough. A more specific object of the present invention is to provide an automobile heater having a motor mounted in improved manner within the confines of the inner wall of a heating member of the general character as briefly outlined.

Other objects of the invention will appear as the description thereof proceeds.

Figure 1:
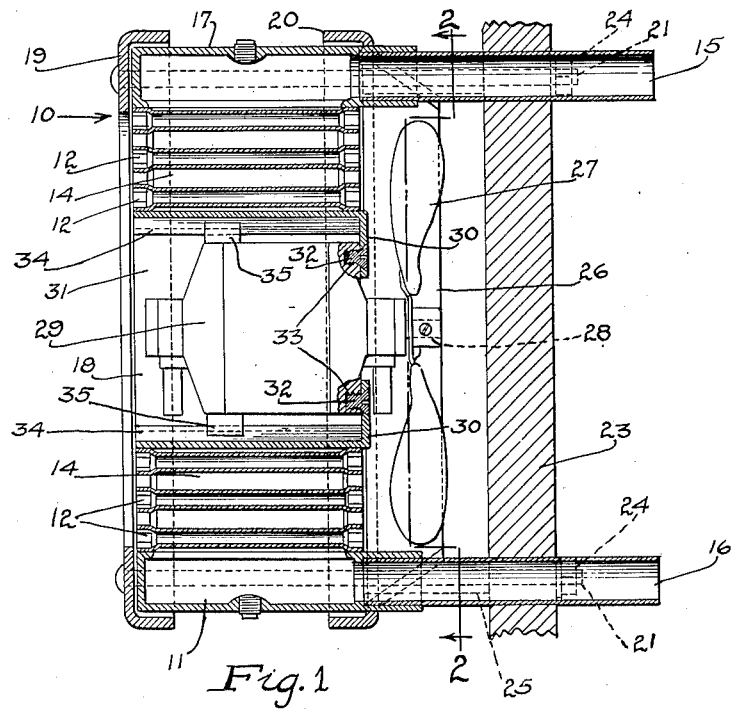
Figure 2:
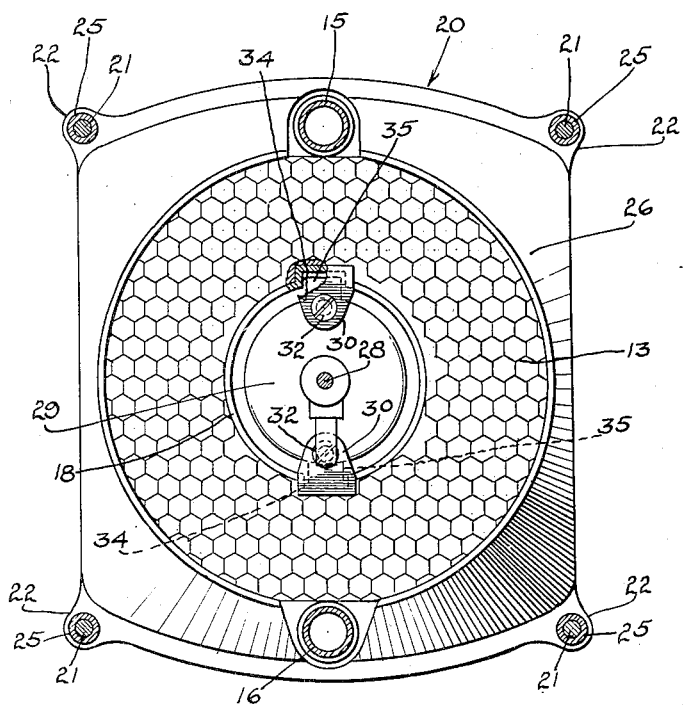

In the accompanying drawing forming a part of this specification;

Fig. 1 is a vertical sectional view partially in elevation of the improved automobile heater of the invention; and Fig. 2 is a sectional view taken as on line 2—2 in Fig. 1, portions of the heating member casing being broken away and in section to better disclose the invention.

As shown, a heating member 10 comprises a casing 11 having a plurality of air-circulating tubes 12 mounted therein. The body portions of the tubes 12 are spaced apart, and the end portions thereof are enlarged. As shown at 13 in Fig. 2, the enlarged end portions are of hexagonal shape, and are fitted and sealed to each other at the opposite sides of the casing 11 to provide water-circulating passages 14 through the heating member and about the air-circulating tubes, so that when air is circulated through the air-circulating tubes while hot water is flowing through the water-circulating passages, the air will be quickly heated. A water intake 15 is provided at the upper portion of the heating member to be connected to a source of water supply, such as the water-circulating cooling system of an internal combustion engine, and a water outlet 16 is provided at the lower portion of the heating member to be connected with said water-circulating cooling system.

As will be clear from the drawing, the casing 11 includes a continuous outer wall 17 and a continuous inner wall 18, the latter wall desirably being disposed centrally of the heating member and providing an opening 31 therethrough. The outer end portions of the walls 17 and 18 are suitably connected with the air-circulating tubes 12 so as to provide a water chamber about said tubes, as very clearly shown in Fig. 1.

Flanged frames 19 and 20 which are oppositely mounted upon the casing 11 are suitably secured together by means of tie-bolts 21 received in apertured lugs 22 provided upon the frames 19 and 20, and each tie-bolt has one of its ends passed through a board 23, which may be the dash-board of an automobile vehicle. Nuts 24 upon the tie-bolts are for securing the heating member to the dash. Spacing sleeves 25 are mounted upon the tie-bolts 21 to space the board 23 and the inner flanged frame 20 apart. The inner ends of the intake 15 and outlet 16 pass through suitable apertures provided in the board 23. The flanged frame 20 desirably has an offset portion 26 which surrounds a fan 27 fixed upon the motor shaft 28 of a motor 29 mounted within the inner continuous wall 18 of the casing 11.

As very clearly shown, said inner wall 18 includes desirably integrally formed lugs 30 which extend transversely of the opening 31 through the casing 11 formed by the inner wall 18, said lugs preferably being disposed adjacent the end of the motor casing which supports the fan 27. Screw bolts 32 which are inserted in apertures in the lugs 30 are turned home into threaded openings 33 in the motor casing to rigidly attach the motor to the heating member.

The inner wall 18 of casing 11 includes diametrically disposed longitudinally extending clearance slots 34 which receive the ordinary lead wire protuberances 35 upon the motor casing.

It will be apparent that the arrangement as described makes provision for fixedly locating the motor 29 within the opening 31 through the heating member in such manner that the fan 27 can be dependably rotated to force air to travel through the air-circulating tubes 12.

In practice, it is the function of the fan 27 to cause air to continuously traverse the air-circulating passages and the interior of a vehicle body to cause the circulated air to pick up heat from the water within the water-circulating passages 14 to thus become heated and to heat the vehicle body interior.

While I have disclosed a single embodiment of my invention, it will be understood that changes in details of construction and arrangement of parts can be made within the spirit of the invention and without departure from the scope of the claim which follows.

I claim as my invention:

Means for positioning and securing a motor within a heating member having an inner wall providing an opening adapted to receive the motor, said wall having longitudinally extending recesses, diametrically disposed projections upon the motor adapted to be received in said recesses, lugs on said inner wall against which the motor is seated, and means for securing the motor to said lugs.

In witness whereof, I have hereunto set my hand this 29 day of Aug., 1929.

HENRY W. FINK.